(12) United States Patent
Qu et al.

(10) Patent No.: US 11,937,029 B2
(45) Date of Patent: Mar. 19, 2024

(54) PROBABILISTICALLY SHAPED UNAMPLIFIED OPTICAL SIGNALING

(71) Applicant: Juniper Networks, Inc., Sunnyvale, CA (US)

(72) Inventors: Zhen Qu, Sunnyvale, CA (US); Xiao Han, Tucson, AZ (US); Yang Yue, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/392,782

(22) Filed: Aug. 3, 2021

(65) Prior Publication Data
US 2023/0043960 A1 Feb. 9, 2023

(51) Int. Cl.
| | |
|---|---|
| *H04Q 11/00* | (2006.01) |
| *G06N 7/01* | (2023.01) |
| *H04B 10/54* | (2013.01) |
| *H04J 14/02* | (2006.01) |

(52) U.S. Cl.
CPC ........ *H04Q 11/0005* (2013.01); *G06N 7/01* (2023.01); *H04B 10/54* (2013.01); *H04J 14/02* (2013.01); *H04Q 2011/0037* (2013.01)

(58) Field of Classification Search
CPC ........ G06N 7/005; H04B 10/54; H04J 14/02; H04Q 2011/0037
See application file for complete search history.

(56) References Cited

U.S. PATENT DOCUMENTS

2020/0266888 A1* 8/2020 Koganei ............... H04J 14/06

FOREIGN PATENT DOCUMENTS

| CN | 115941420 A | 4/2023 |
| WO | WO-2020108771 A1 * | 6/2020 |

OTHER PUBLICATIONS

Irina Bristena Vasile, "Wavelength division multiplexing WDM, CWDM and DWDM applications", 2007, Proceeding of SPIE, SPIE vol. 6635 (Year: 2007).*
Jose Krause Perin, "Data center links beyond 100 Gbit/s per wavelength", Dec. 17, 2017, ELSEVIER, All Pages (Year: 2017).*
Fred Buchali, "Flexible Optical Transmission close to the Shannon Limit by Probabilistically Shaped QAM", 2017, Optical Society of America, All Pages (Year: 2017).*
"European Application Serial No. 21196627.0, Response filed Aug. 4, 2023 to Extended European Search Report dated Mar. 9, 2022", 7 pgs.
"European Application Serial No. 21196627.0, Extended European Search Report dated Mar. 9, 2022", 9 pgs.

(Continued)

*Primary Examiner* — Pranesh K Barua
(74) *Attorney, Agent, or Firm* — Schwegman Lundberg & Woessner, P.A.

(57) ABSTRACT

An optical transmitter can generate probabilistically shaped quadrature amplitude modulation (PS-QAM) signaling for transmission over a fiber to a destination without optical amplification. The single fiber can transmit the PS-QAM signaling using dense wavelength division multiplexing having a relatively large number of channels that are closely spaced. A coherent receiver can receive the PS-QAM signaling for decoding without implementing chromatic dispersion compensation.

16 Claims, 10 Drawing Sheets

(56) References Cited

OTHER PUBLICATIONS

Bosco, Gabriella, "Advanced Modulation Techniques for Flexible Optical Transceivers: The Rate Reach Tradeoff", Journal of Lightwave Technology, IEEE, USA, vol. 37, No. 1, (Jan. 1, 2019), 36-49.
Han, "Joint Probabilistic-Nyquist Pulse Shaping for an LDPC-Coded 8-PAM Signal in DWDM Data Center Communications", Applied Sciences, vol. 9, No. 23, (Nov. 20, 2019).
Sato, Ken-Ichi, "How Optical Technologies Can Innovate Intra Data Center Networks", 2021 International Conference On Computer Communications and Networks (ICCCN), IEEE, (Jul. 19, 2021), 1-8.
Zou, Dongdong, "Amplifier-less transmission of beyond 100-Gbit s [lambda] signal for 40-km DCI-Edge with 10G-class O-band DML", Journal of Lightwave Technology, IEEE, USA, vol. 38, No. 20, (Jun. 22, 2020), 5649-5655.

\* cited by examiner

PROBABILISTICALLY SHAPED UNAMPLIFIED OPTICAL SIGNALING

TECHNICAL FIELD

The present disclosure generally relates to optical and electrical devices and more particularly to sending and receiving optical signaling.

BACKGROUND

Wavelength-division multiplexing (WDM) can combine different optical signals onto a fiber by using different wavelengths of light (e.g., channels) for each of the different optical signals. The combined WDM signal can be transmitted and received by a receiver which can separate the signals on the different channels based on signals being on the different wavelengths. While wavelength-division multiplexing enables multiple signals to be transmitted and received on a single fiber, increasing the number of channels and decreasing the spacings between the channels to increase the data rate is difficult due to noise issues of the network and inter-channel cross talk.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

In many industries, such as IT, healthcare, and finance, the data-traffic demand is rapidly growing for both consumers and business applications. One approach to keep pace with the rapidly growing demand is to combine high-capacity quadrature amplitude modulator (QAM) signaling with dense wavelength division multiplexing (DWDM) channels in a single optical link (e.g., fiber). Coherent detection allows equalizing linear channel impairments via digital signal processing (DSP) because both phase and amplitude information of optical signals can be linearly converted to the electrical field.

An intra-datacenter network can implement FR (usually <=2 km) links to high speed connections; however, it is becoming increasingly difficult to perform fiber management and capacity updates, as the aggregate fiber capacity is limited by current signaling approaches, such as 4-level Pulse Amplitude Modulation (PAM4). Dense wavelength division multiplexing (DWDM) can be implemented to transmit multiple independent optical signals over a single a single fiber, where each optical signal has a well-defined but slightly different wavelength, which can mitigate potential fiber management and capacity update issues. However, one issue with expanding the number of channels in these optical networks is the limitation of the passband of optical amplifiers, such as an Erbium-Doped Fiber Amplifier (EDFA). Moreover, commonly used optical components are developed with the operation bandwidth similar to EDFA, which results in the number of channels still being limited as a default design.

To this end, intra-data center network architecture can implement probabilistic shaping (PS) in 64 QAM signaling, which results in a large sensitivity performance. The probabilistically shaped 64 QAM in short reach intra-data center network links (e.g., over a fiber) can be implemented without amplification, thereby avoiding passband issues and enabling many additional lanes to be added to achieve DWDM (e.g., with 50 GHz spacings between channels, and 80 or more channels). Further, the probabilistically shaped 64 QAM signaling architecture is tolerant of chromatic dispersion, and a chromatic dispersion compensation module is not included in the receiver, which results in significantly reduced power consumption.

Figure 1:
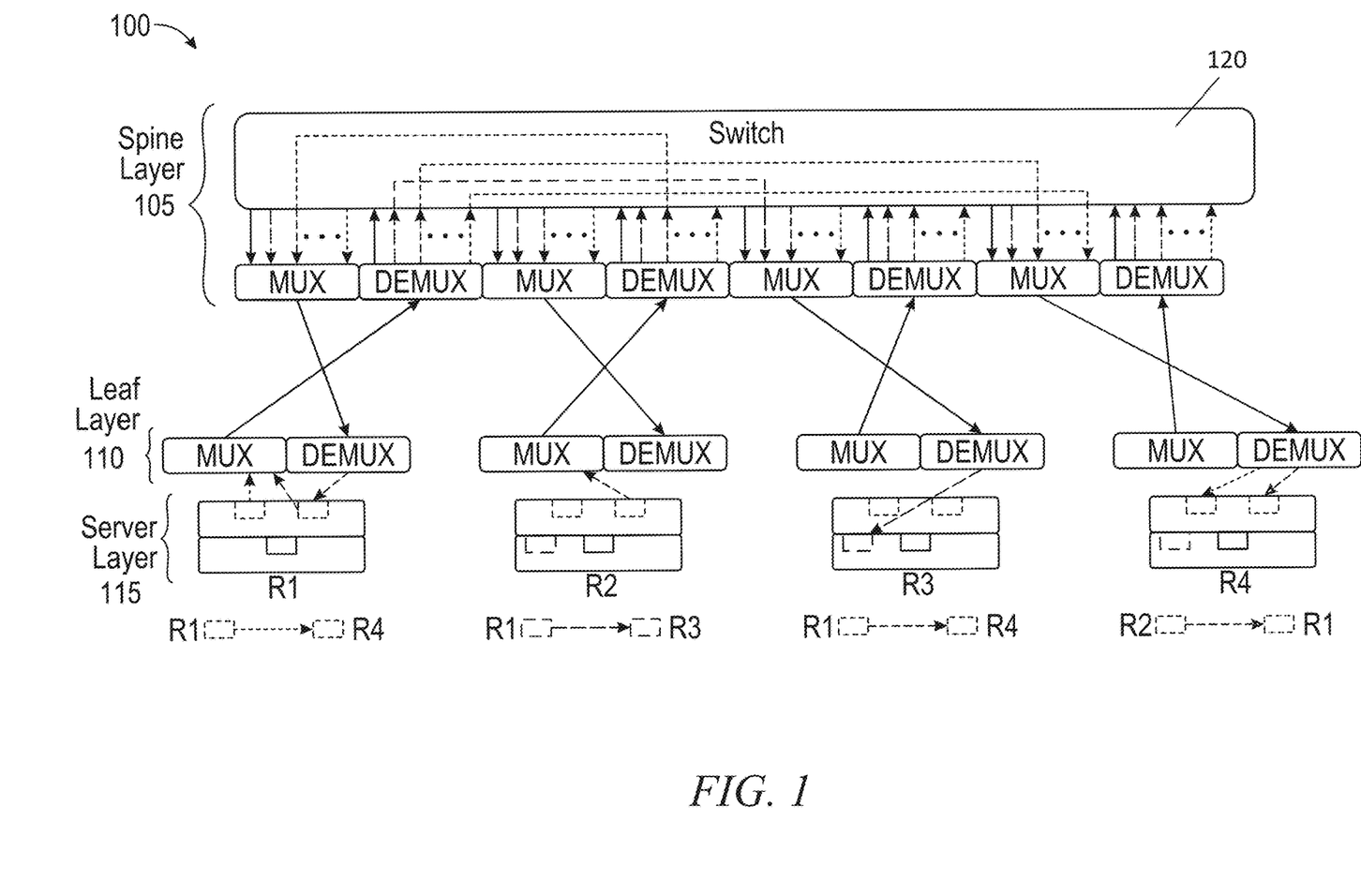
FIG. 1 shows an example intra-datacenter optical network, according to some example embodiments.

FIG. 1 shows an example intra-datacenter optical network 100, according to some example embodiments. In the illustrated example, data is transmitted between a plurality of end-nodes, such as servers in a server layer 115. Each of the servers can include an optical-electrical transceiver that can convert electrical data into optical signals for transmission to other servers. When the receiving servers receive the optical signals, the receiving servers convert the optical signals back into the original electrical data for further processing or routing, in accordance with some example embodiments. The connections between the servers in the server layer 115 are multiplexed and demultiplexed in a leaf layer 110 of the intra-datacenter optical network 100, and further multiplexed and demultiplexed in the spine layer 105, which is the top layer of the intra-datacenter optical network 100. The spine layer 105 includes a switch 120 which receives data and routes the data to the destination. In some example embodiments, the switch 120 is implemented as an optical-electrical-optical switch. In some example embodiments, the switch 120 can be configured as a pure optical switch, with no conversion to electricity via an electrical interface.

Figure 2:
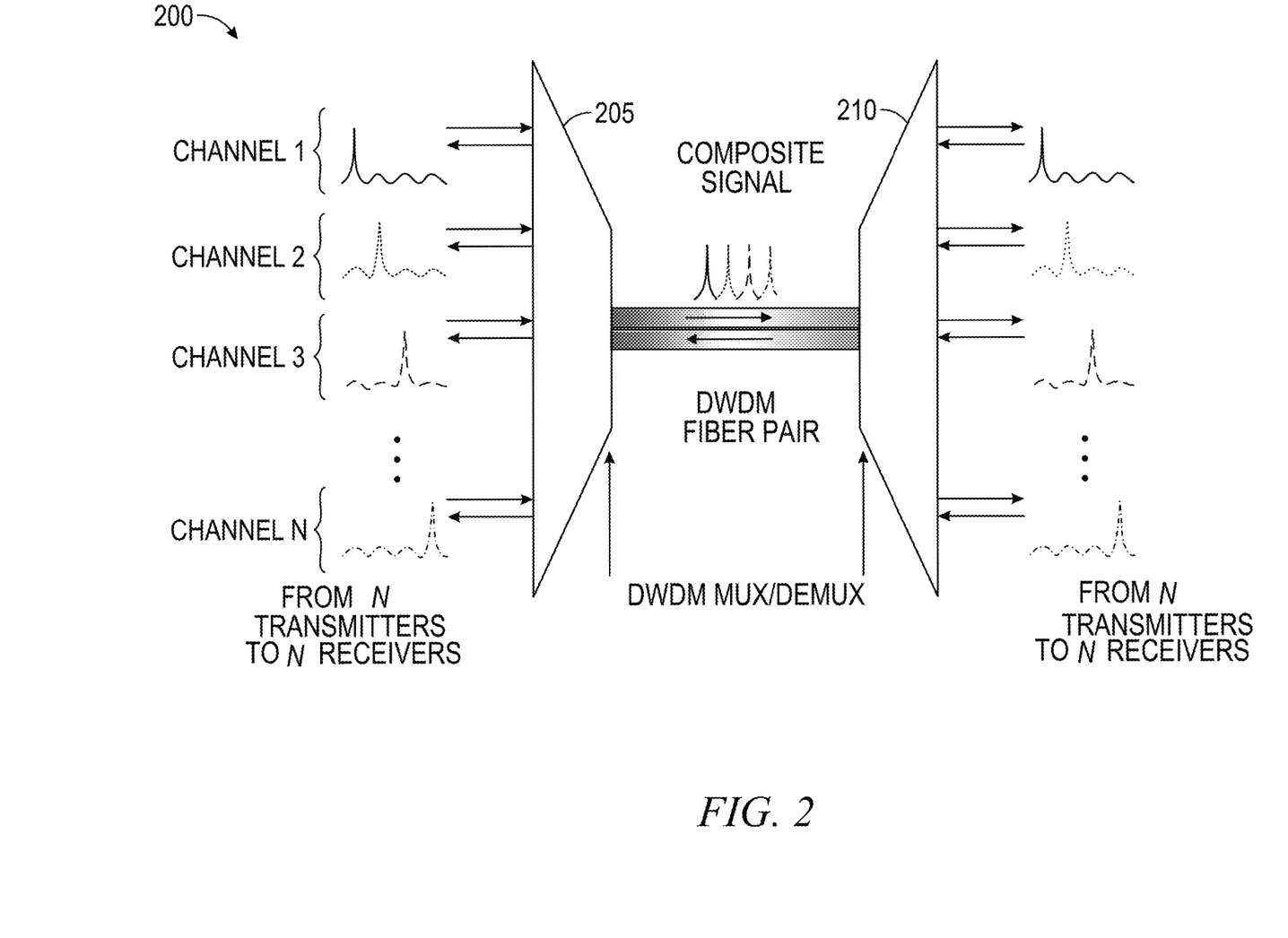
FIG. 2 shows a dense wavelength division multiplexed (DWDM) architecture, according to some example embodiments.

FIG. 2 shows a dense wavelength division multiplexed (DWDM) architecture 200, according to some example embodiments. In the illustrated example, each of the channels is separated by a frequency spacing. For example, the wavelength of channel 1 is separated from the wavelength of channel 2, and so on, and channels are combined by multiplexer 205 and demultiplexed by their respective wavelengths using demultiplexer 210 at the destination receiver. Generally, Coarse Wavelength Division Multiplexing (CWDM) provides up to 16 channels, whereas DWDM implements denser channel spacings (e.g., 160 or more channels with 50 GHz spacings, 160 or more channels with 75 GHz spacings, 160 or more channels with 50 GHz spacings, 200 or more channels with 25 GHz spacings). While DWDM can maximize the aggregate fiber capacity and maximize server expansions, DWDM cannot be implemented in conventional intra-datacenter connections due to cross-talk issues. For instance, intra-data center architectures conventionally cannot achieve 64 QAM at 50 GHz spacings (between channels) due to the inter-channel cross-talk issues, in contrast to the PM-64QAM DWDM architecture discussed below.

Figure 3:
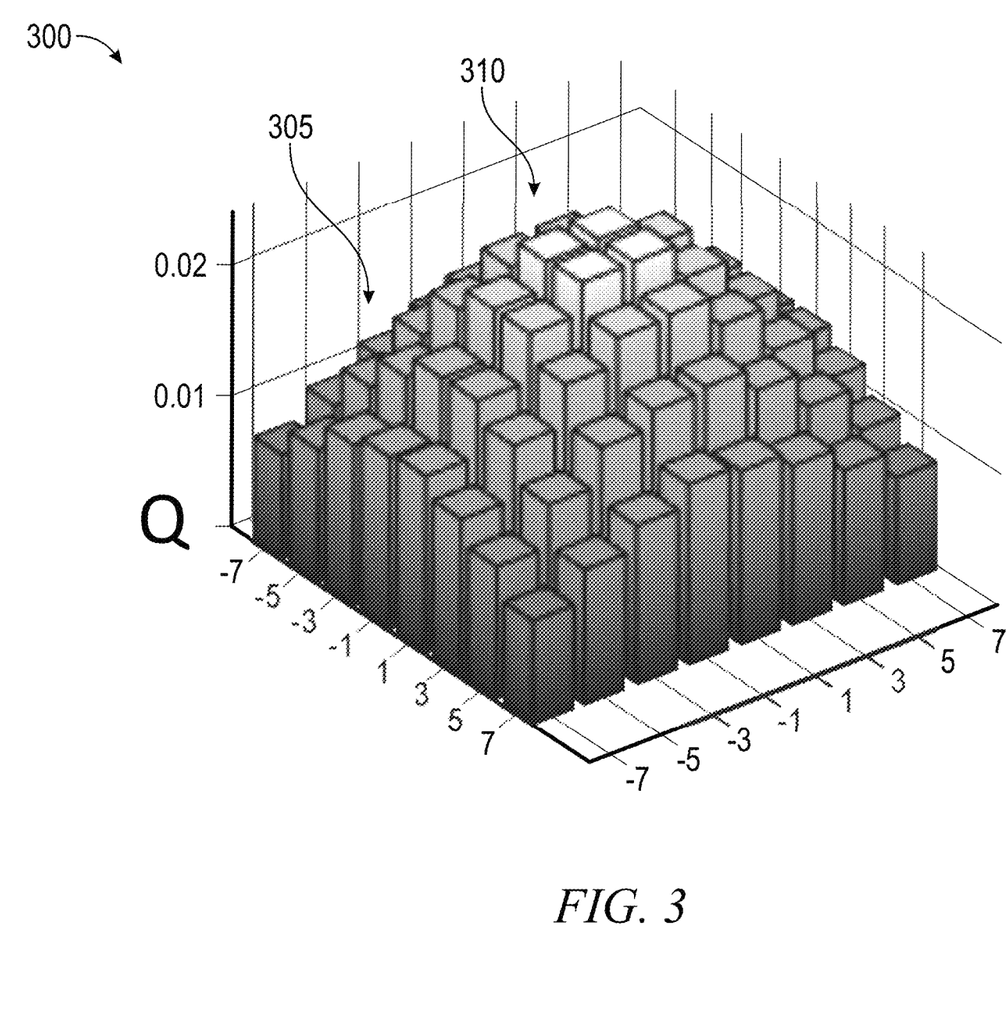
FIG. 3 shows an example probabilistically shaped QAM graph, according to some example embodiments.

FIG. 3 shows an example probabilistically shaped QAM graph 300, according to some example embodiments. The graph 300 is a three-dimensional constellation diagram, with the I and Q branches corresponding to the horizontal axes of the graph 300, and the vertical axis corresponding to the probability of a given constellation point being mapped to. For example, each of the columns 305 corresponds to one point of 64 constellation points of a 64 QAM scheme (e.g., the graph is a constellation diagram viewed from a perspective, with vertical height corresponding to probability of each constellation point, or mode). As illustrated, due to the probabilistic shaping, the higher power modes (noisy points) near the edges of the graph 300 have low probabilities, while the columns 310 in the center, which are lower power, have high probability.

Figure 4:
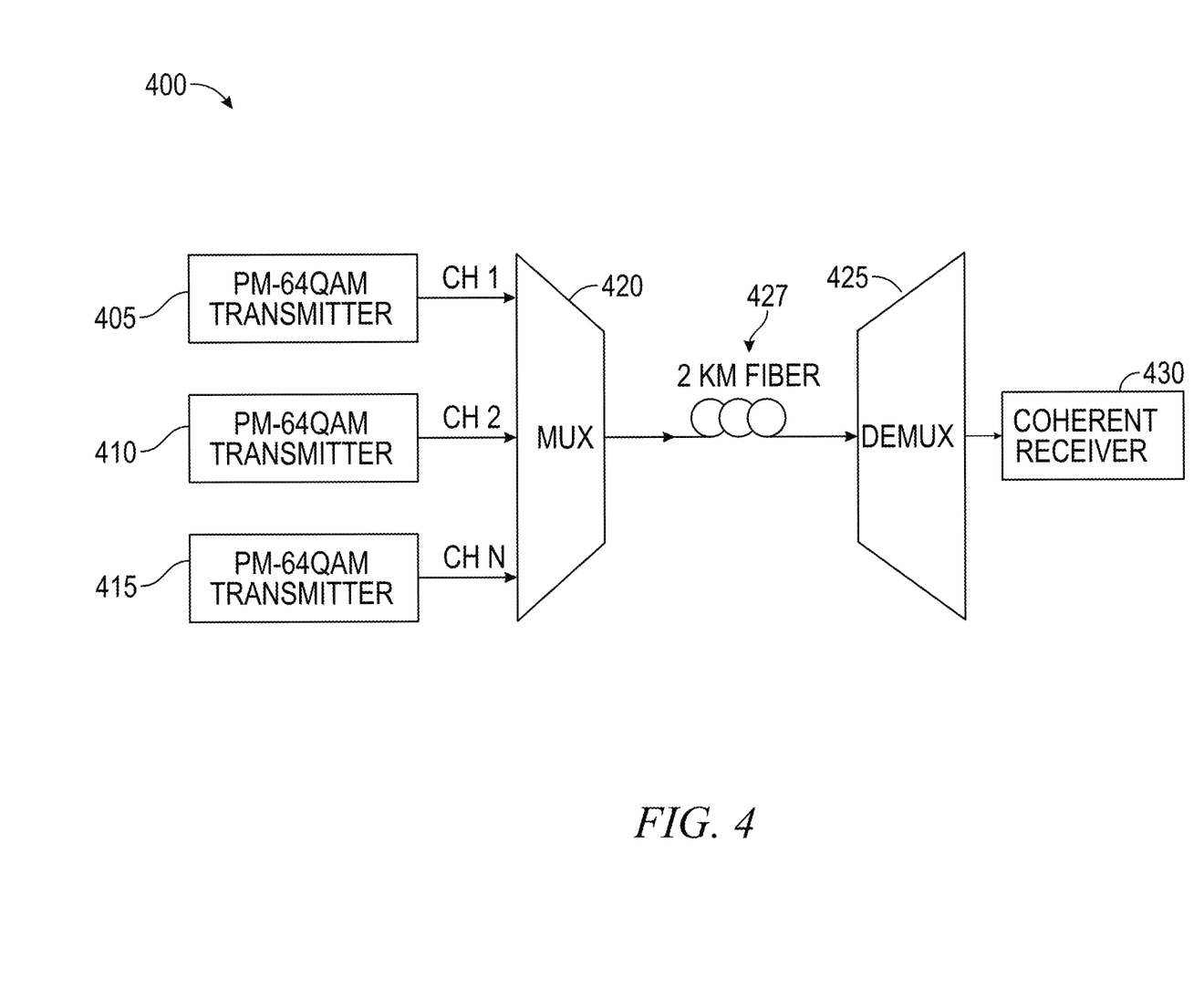
FIG. 4 shows an example PM-64QAM DWDM transmission signaling architecture, according to some example embodiments.

FIG. 4 shows an example PS-64QAM DWDM signaling architecture 400, according to some example embodiments. As illustrated, the PS-64QAM DWDM signaling architecture 400 comprises a plurality of probabilistically shaped 64 QAM transmitters 405-415. The PS 64 QAM signals from the different transmitters 405-415 correspond to different channels, which are multiplexed by the multiplexer 420 and transmitted on a FR link 427 (e.g., under 2 km) for intra-datacenter connections (e.g., FIG. 1) to a destination demultiplexer 425 at the destination. The demultiplexer 425 separates the DWDM channels, which can then be recovered via a coherent receiver 430 (e.g., converted from optical back into electrical data). In some example embodiments, a second-order super Gaussian profile is used in the multiplexer 420 and demultiplexer 425, and the three illustrated channels are in a 50-GHz grid (e.g., 50 GHz spacing), with a central channel frequency of 193.1 THz. In some example embodiments, the PS-64QAM DWDM signaling architecture 400 is implemented for connections in a data center, as discussed above. In some example embodiments, the PS-64QAM DWDM signaling architecture 400 can be implemented in a single device (e.g., between different chips on a board), or in a single co-packaged chip. For example, the transmitters 405-415 can be co-packaged optical PICs, that transmit to an electrical ASIC switch for routing, and the coherent receiver is another PIC on the same co-packaged chip that receives probabilistically shaped signaling and decodes it, in accordance with some example embodiments.

In some example embodiments the multiplexer 420 is external to the transmitters 405-415 and the demultiplexer 425 is external to the coherent receives (e.g., coherent receiver 430) and the independent multiplexer/demultiplexers are integrated in the leaf switch architecture (e.g., in the leaf layer 110, FIG. 1). In other example embodiments, the multiplexer 420 is integrated in a transmitter device (e.g., in an optical transmitter PIC that is integrated in server R1) and the demultiplexer 425 is integrated in the receiver device (e.g., in an optical receiver PIC that is integrated in server R4).

Figure 5:
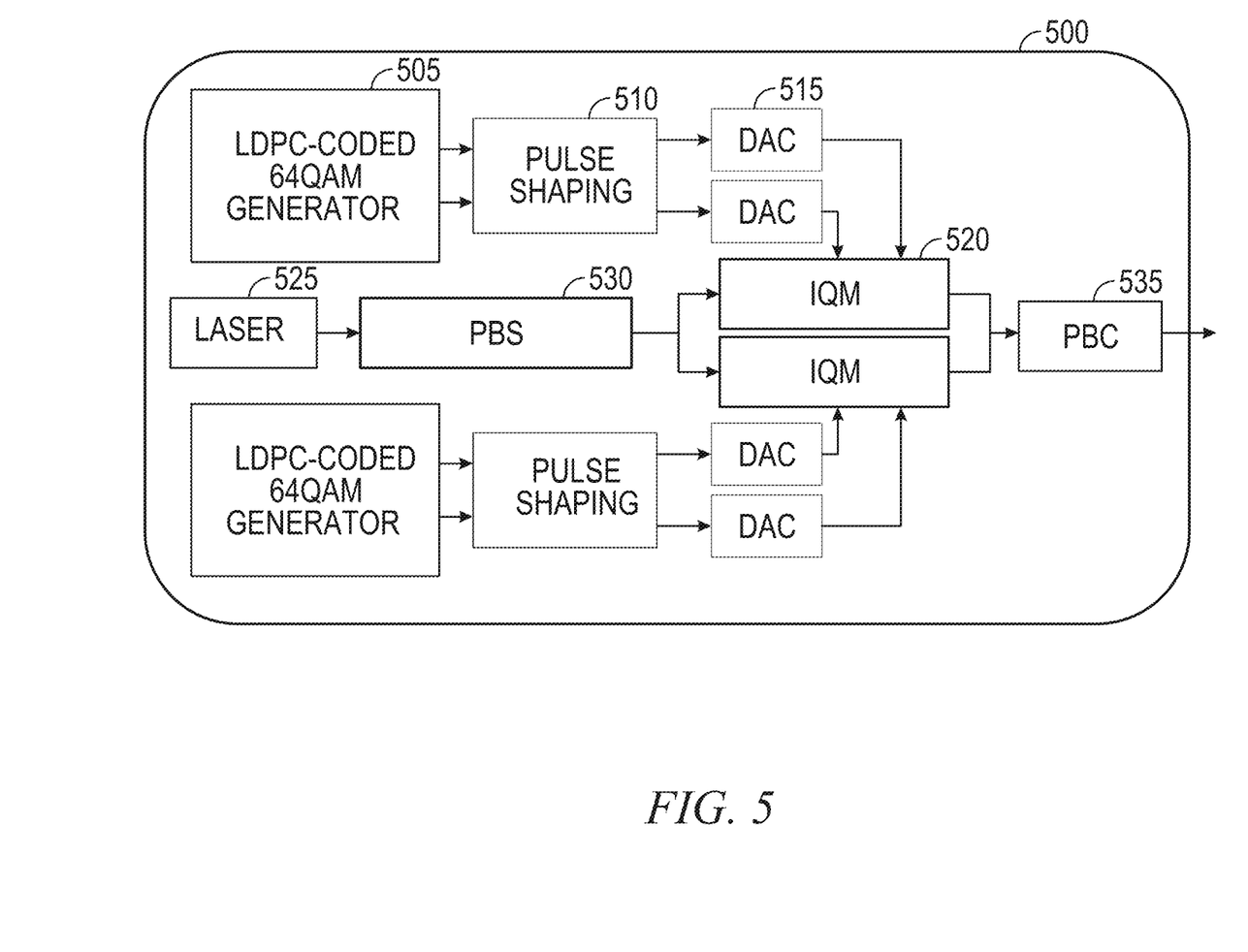
FIG. 5 shows an example transmitter, according to some example embodiments.

FIG. 5 shows an example PS-QAM transmitter 500, according to some example embodiments. The PS-QAM transmitter 500 is an example of the PS 64 QAM transmitters 405-415. As illustrated, the PS-QAM transmitter 500 comprises generators, such as PS QAM generator 505, that generate the probabilistically shaped 64 QAM on two branches (I/Q) that are input into the pulse shaping block 510. The pulse shaping block 510 shapes the channel to reduce cross talk between the channels, and outputs the signals to digital-to-analog converters (DACs), such as DAC 515. The DACs generate analog signal on the I and Q branches which are RF inputs into I/Q modulators, such as I/Q modulator 520. The I/Q modulators receive light from the laser 525 that is split by a polarization beam spitter 530 into differently polarized beams. The differently polarized beams are used to generate two 65 QAM signals (e.g., one from the upper arm or branch of optical transmitter 500 and one from the lower arm or branch of optical transmitter 500), which can then be multiplexed together using a polarization beam combiner 535 to generate the PS LDPC-coded PS-64QAM optical signal for transmission to the destination.

Figure 6:
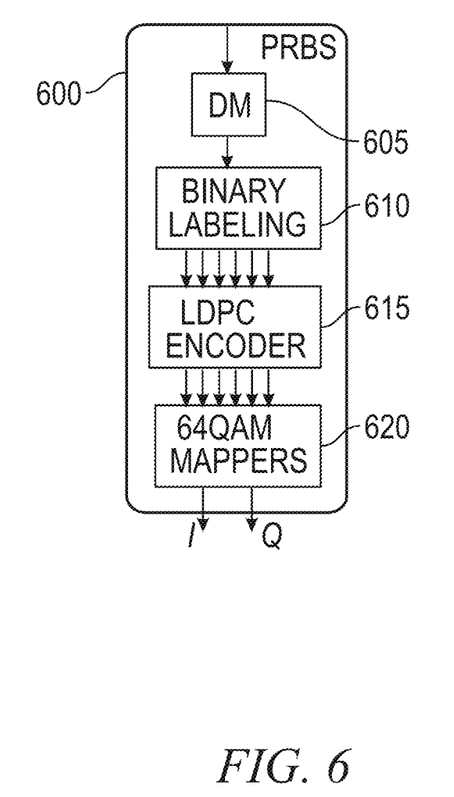
FIG. 6 shows an example generator, according to some example embodiments.

FIG. 6 shows an example generator 600, according to some example embodiments. The generator 600 is an example of generators in optical transmitter 500, such as the generator 505 in FIG. 5. In the example of FIG. 6, the LDPC code rate of uniform distribution is 8/9, the PS distribution code rate is 0.9, and the entropy of probabilistically shaped distribution is 5.9259 bits/symbol. In the example illustrated, a Pseudo Random Binary Sequence (PRBS) is generated and input into a distribution matcher 605 (DM) to generate a sequence with the probability distribution. As discussed above with reference to FIG. 3, the probabilistically shaped distribution implements symbols with lower amplitudes more often than larger symbols having higher amplitudes. The PS-shaped modulation format enables a more power-efficient solution and is less sensitive to the noise when compared with uniform distribution, which will increase the channel capacity and reduce the gap to Shannon limit. In some example embodiments, a Maxwell-Boltzmann (MB) distribution is implemented by the generator 600. In the MB distribution, each constellation point $\alpha_i$ has a transmission probability as follows:

$$P(\alpha_i) = \exp(-\lambda \|\alpha_i\|^2)/Z(\lambda), \lambda \geq 0$$

where the function $Z(\lambda)$ normalizes the probability to ensure probabilities of occurrence of symbols sum-up to one, where the normalization function $Z(\lambda)$ is:

$$Z(\lambda) = \Sigma_i \exp(-\lambda \|\alpha_i\|^2), \lambda \geq 0$$

The binary labeling block 610 labels symbol data with the binary representation (e.g., converts the symbol-3 to binary '011'). In some example embodiments, the binary labeling block 610 generates six parallel binary sequences for every bit of the 64QAM signal, which are then input into the LDPC encoder 615 for low-density parity encoding (e.g., Forward Error Correction (FEC) encoding, other Error Correcting Code (ECC)). The encoded sequence for the LDPC encoder 615 is then input into the 64QAM mapper 620, which outputs the PS-QAM signaling which are used as RF inputs for I/Q modulation (e.g., after one or more DACs) as discussed above, with reference to FIG. 5.

Figure 7:
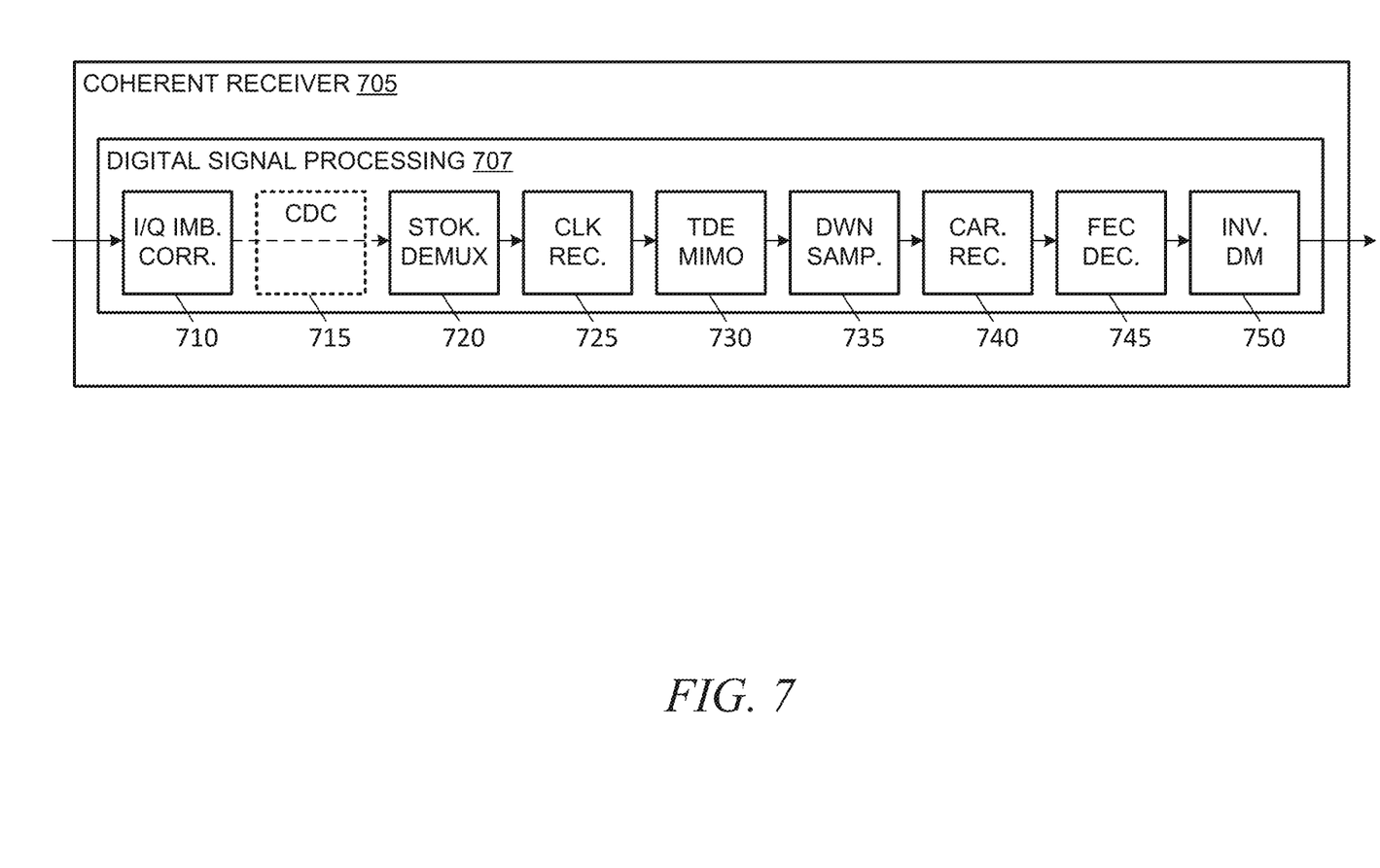
FIG. 7 shows an example coherent receiver, according to some example embodiments.

FIG. 7 shows an example coherent receiver 705, according to some example embodiments. The coherent receiver 705 is an example of any of the coherent receivers of the PS-QAM architecture, discussed above, such as coherent receiver 430. In some example embodiments, the coherent receiver 430 has an inverse PS scheme that is inverse of the transmitter PS scheme (e.g., the PS scheme implemented by generator 600, FIG. 6).

In the illustrated example, only a DSP 707 of the coherent receiver 705 is shown for brevity; however, the coherent receiver 705 can implement other blocks to implement a coherent optical receiver (e.g., analog-to-digital converters (ADCs), oscillators). In accordance with some example embodiments, the I/Q imbalance correction block 710 inputs into a chromatic dispersion compensation (CDC) block 715, which can be excluded as discussed below. The CDC block 715 inputs into a Stokes-space polarization demultiplexer block 720, which inputs to a clock phase recovery block 725, which inputs to an adaptive TDE MIMO-CMA block 730, which is then down sampled by the down sampling block 735, which then inputs into the carrier phase recovery block 740 for phase recovery. Further, the signal can undergo forward error correction (FEC) decoding in FEC decoding block 745, which inputs into inverse distribution matcher block 750. In some example embodiments, the inverse distribution matcher block 750 implements an inverse probabilistic distribution of the distribution implemented by the DM of the transmitter (e.g., DM 605, FIG. 6).

In some example embodiments, due to the PS-shaping and implementing an inverted probabilistic distribution, the PS-QAM receiver is chromatic-dispersion tolerant and the CDC block 715 can be omitted from the DSP 707, thereby simplifying the processing and reducing the power consumption of the receiver 705. In some example embodiments, the coherent receiver 705 does not include the CDC block 715 (as indicated by the dotted border of the block 715 and the arrow directly connecting the output of the I/Q imbalance correction block 710 to the Stokes-space polarization demultiplexer block 720).

Figure 8:
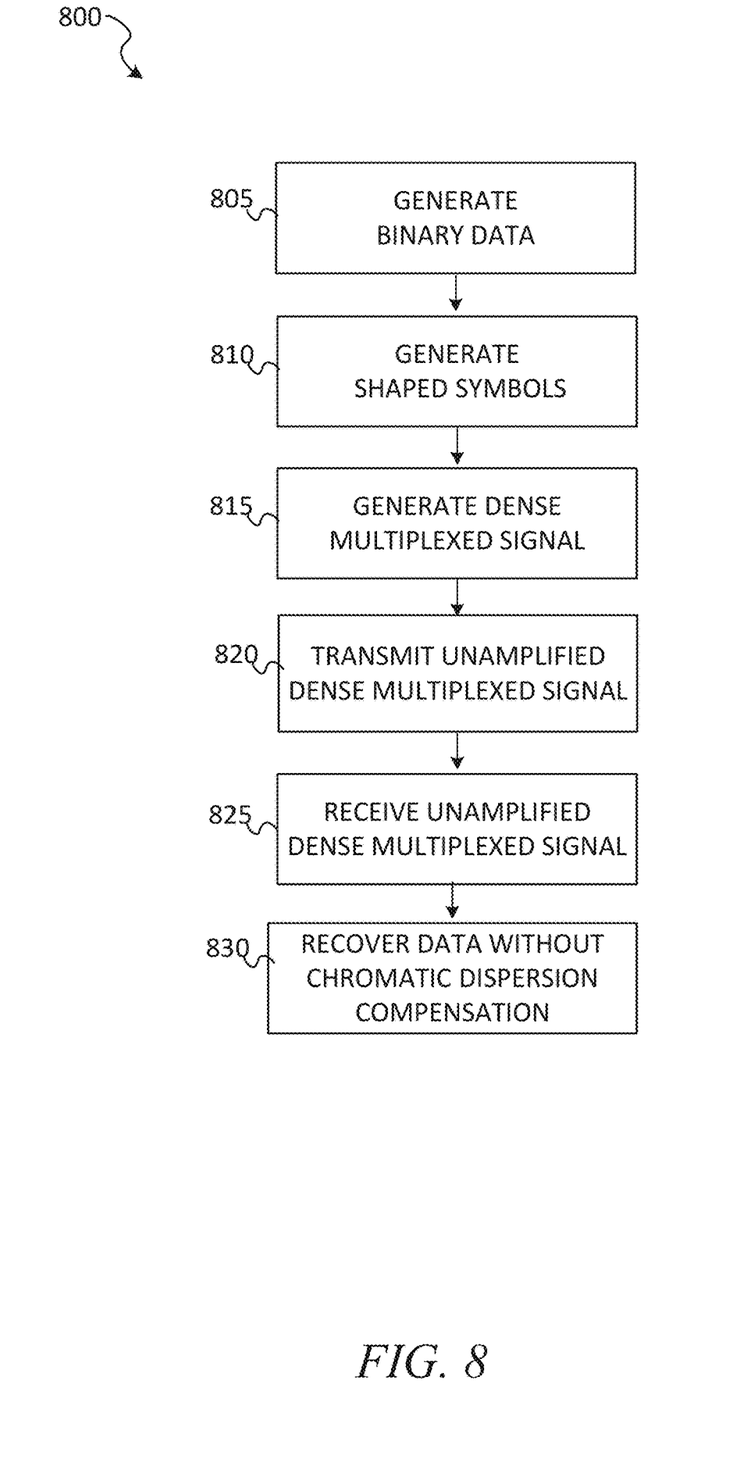
FIG. 8 show an example flow diagram of a method for implementing PS-QAM signaling, according to some example embodiments.

FIG. 8 show an example flow diagram of a method 800 for implementing PS-QAM signaling, according to some example embodiments. At operation 805, a device generates binary data for transmission. For example, a server in the server layer 115 generates data for transmission in the intra-datacenter optical network 100. At operation 810, a PS-QAM transmitter 500 (e.g., in the server R1, FIG. 1) generates probabilistically shaped symbols (e.g., using one or more LDPC-Coded 64QAM generators). At operation 815, the PS-QAM transmitter 500 generates DWDM signaling. At operation 820, the DWDM signaling is transmitted over short reach (e.g., 2 kilometers, intra-datacenter) using a fiber, without optically amplifying the DWDM signaling. At operation 825, the unamplified DWDM signaling is received by another server in the server layer 115 (e.g., a coherent receiver in server R4 receives the signaling). At operation 830, the DWDM is processed in a DSP of the receiving server without implementing chromatic dispersion compensation.

Figure 9:
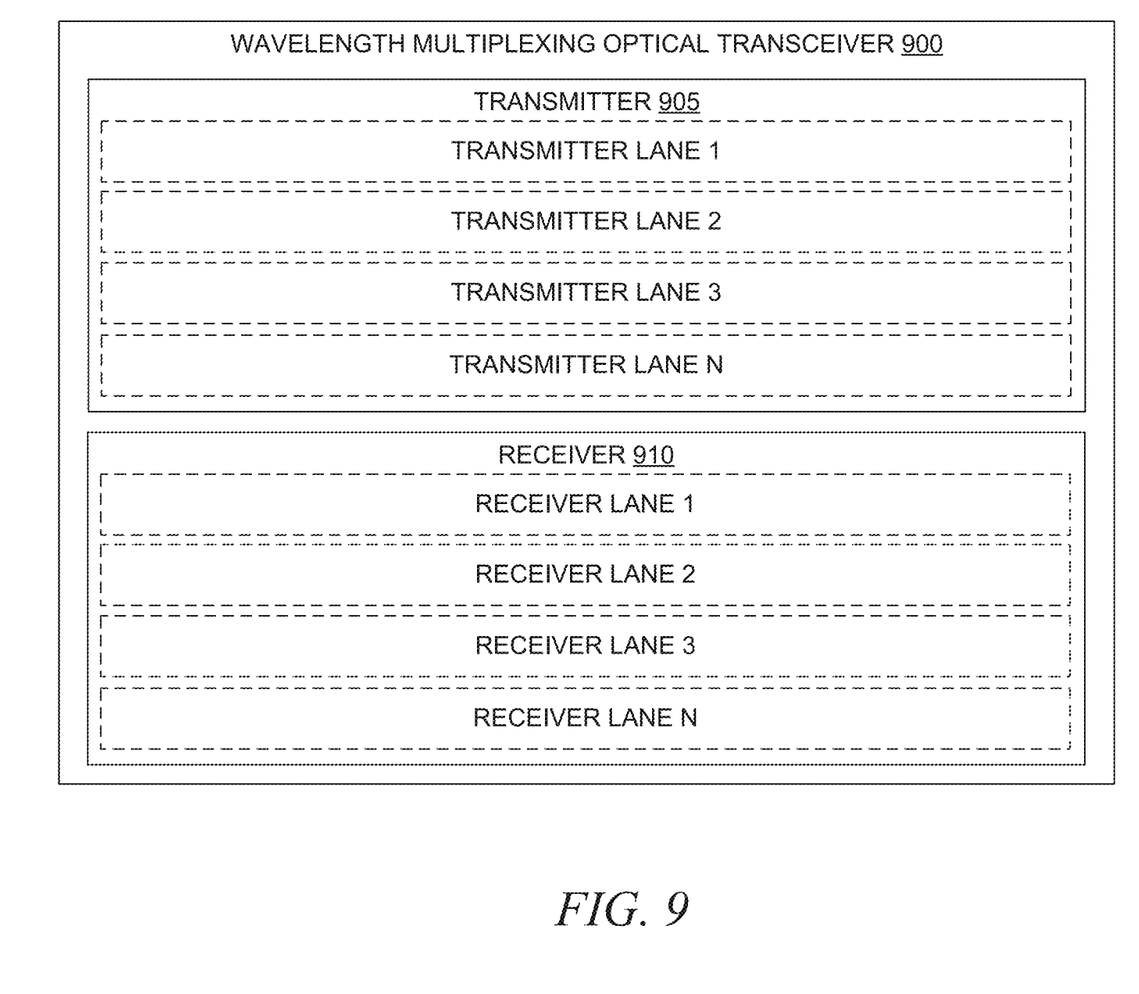
FIG. 9 shows an example optical transceiver, according to some example embodiments.

FIG. 9 shows an example multi-lane wavelength division multiplexing optical transceiver 900, according to some example embodiments. In the illustrated embodiment, the optical transceiver 900 comprises an integrated photonic transmitter structure 905 and an integrated photonic receiver structure 910. In some example embodiments, the integrated photonic transmitter structure 905 and the integrated photonic receiver structure 910 are example optical components fabricated as a PIC device, such as PIC 1020 of FIG. 10, discussed below. The integrated photonic transmitter structure 905 is an example of a DWDM transmitter having a plurality of lanes, transmitter lanes 1-N, in which each lane handles a different wavelength of light. The integrated photonic receiver structure 910 is an example of a DWDM receiver that receives DWDM light (e.g., from an optical network or from the integrated photonic transmitter structure 905 in loopback mode). The integrated photonic receiver structure 910 can receive and process light by filtering, amplifying, and converting it to electrical signal using components such as multiplexers, semiconductor optical amplifiers (SOAs) and one or more detectors such as photodetectors (e.g., photodiodes).

Figure 10:
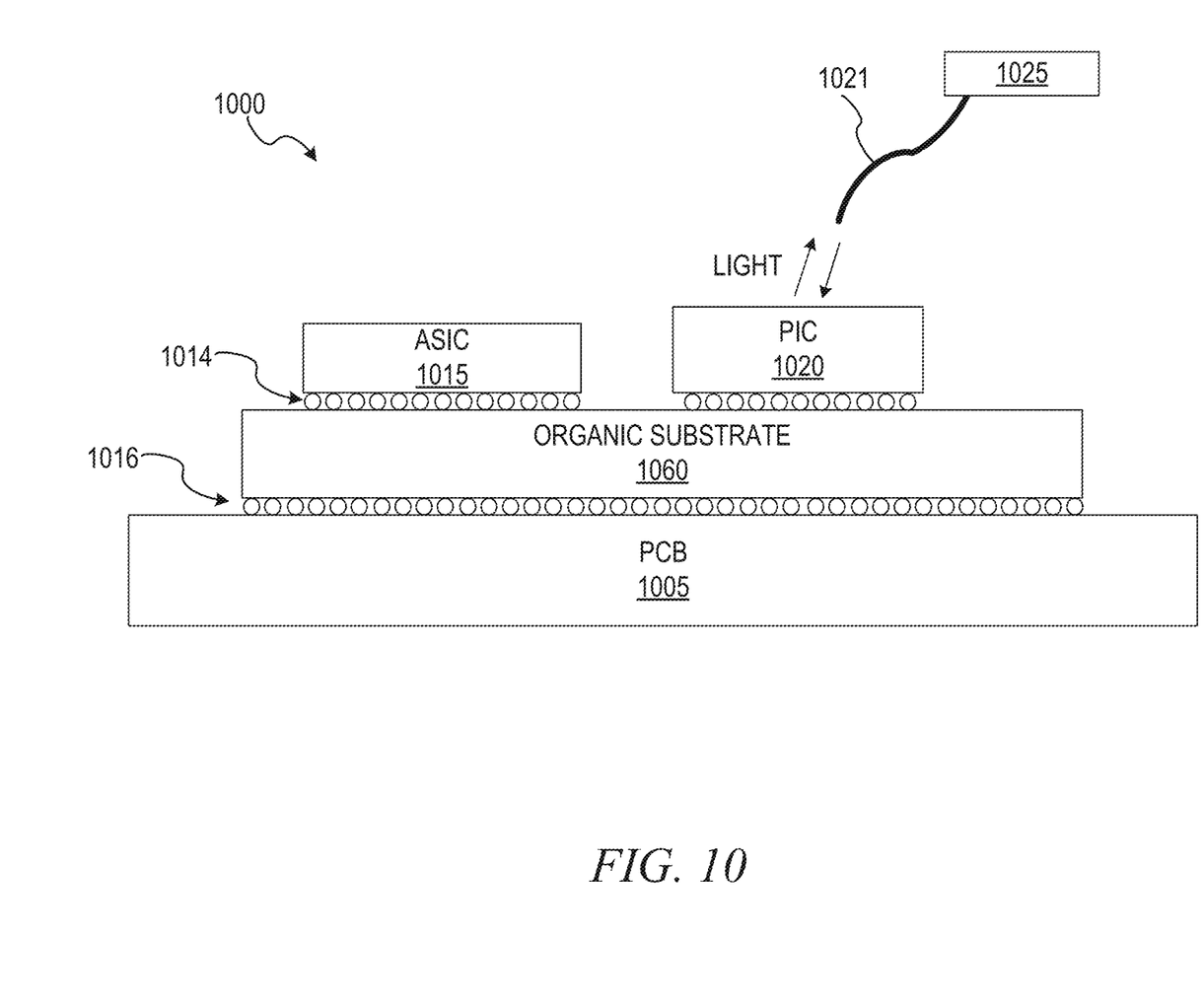
FIG. 10 is a diagram showing a side view of an optical-electrical device, according to some example embodiments.

FIG. 10 shows a side view of an optical-electrical device 1000 including one or more optical devices, according to some example embodiments. In illustrated embodiment, the optical-electrical device 1000 is shown to include a printed circuit board (PCB) substrate 1005, organic substrate 1060, an application-specific integrated circuit 1015 (ASIC) and photonic integrated circuit 1020 (PIC).

In some example embodiments, the PIC 1020 includes silicon on insulator (SOI) or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V-based materials may be significantly higher than in silicon-based materials, as electron speed in III-V semiconductors is much faster than that in silicon. In addition, III-V materials have a direct bandgap, which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic (MO) materials allow heterogeneous PICs to operate based on the MO effect. Such devices may utilize the Faraday Effect, in which the magnetic field associated with an electrical signal modulates an optical beam, offering high bandwidth modulation, and rotates the electric field of the optical mode, enabling optical isolators. Said MO materials may comprise, for example, materials such as iron, cobalt, or yttrium iron garnet (YIG). Further, in some example embodiments, crystal substrate materials provide heterogeneous PICs with a high electro-mechanical coupling, linear electro-optic coefficient, low transmission loss, and stable physical and chemical properties. Said crystal substrate materials may comprise, for example, lithium niobate ($LiNbO_3$) or lithium tantalate ($LiTaO_3$).

In the example illustrated, the PIC 1020 exchanges light with an external light source 1025 via an optical fiber 1021, in a flip-chip configuration where a top-side of the PIC 1020 is connected to the organic substrate 1060 and light propagates out (or in) from a bottom-side of the PIC 1020 facing away (e.g., towards a coupler), according to some example embodiments. The optical fiber 1021 can couple with the PIC 1020 using a prism, grating, or lens, according to some example embodiments. The optical components of PIC 1020 (e.g., optical modulators, optical switches) are controlled, at least in part, by control circuitry included in ASIC 1015. Both ASIC 1015 and PIC 1020 are shown to be disposed on copper pillars 1014, which are used for communicatively coupling the PICs via organic substrate 1060. PCB substrate 1005 is coupled to organic substrate 1060 via ball grid array (BGA) interconnect 1016 and may be used to interconnect the organic substrate 1060 (and thus, ASIC 1015 and PIC 1020) to other components of the optical-electrical device 1000 not shown (e.g., interconnection modules, power supplies, etc.).

In view of the disclosure above, various examples are set forth below. It should be noted that one or more features of an example, taken in isolation or combination, should be considered within the disclosure of this application.

Example 1. An intra-datacenter optical switch network comprising: a probabilistically shaped quadrature amplitude modulation (PS-QAM) transmitter that generates probabilistically shaped QAM symbols using a probability distribution, a DWDM multiplexer combines PS-QAM signals for transmission over fiber links within the intra-datacenter optical switch network, the DWDM signal comprising a plurality of channels at different wavelengths that are combined using a multiplexer of the PS-QAM transmitter, each of the channels comprising a PS-QAM signal; a DWDM demultiplexer separate the wavelength channels to each branch and a PS-QAM coherent receiver to receive one of the channels; and one or more fiber links that transmit the DWDM signal from the PS-QAM transmitter to the PS-QAM coherent receiver without optical amplification.

Example 2. The intra-datacenter optical switch network of example 1, wherein the PS-QAM coherent transmitter comprises a plurality of distribution matchers that generate the probabilistically shaped QAM symbols using the probability distribution.

Example 3. The intra-datacenter optical switch network of any of examples 1 or 2, wherein the PS-QAM coherent receiver processes the separate PS-QAM signals without applying chromatic desperation compensation to the signal.

Example 4. The intra-datacenter optical switch network of any of examples 1-3, wherein the PS-QAM coherent receiver decodes the separate PS-QAM signals using an inverse probability distribution that is inverse of the probability distribution of the PS-QAM coherent transmitter.

Example 5. The intra-datacenter optical switch network of any of examples 1-4, further comprising a plurality of nodes and a spine switch.

Example 6. The intra-datacenter optical switch network of any of examples 1-5, wherein the PS-QAM transmitter is in a first node of the plurality of nodes, and the PS-QAM coherent receiver is in a second node of the plurality of nodes.

Example 7. The intra-datacenter optical switch network of any of examples 1-6, wherein the plurality of nodes are servers in the intra-datacenter optical switch network, the first node being a first server and the second node being a second server.

Example 8. The intra-datacenter optical switch network of any of examples 1-7, wherein the spine switch transmits the DWDM signal from the PS-QAM transmitters to the PS-QAM coherent receivers without optical amplification.

Example 9. The intra-datacenter optical switch network of any of examples 1-8, wherein the DWDM signal is transmitted over a single fiber of the one or more fiber links.

Example 10. The intra-datacenter optical switch network of any of examples 1-9, wherein the probabilistically shaped QAM symbols are shaped according to the probability distribution to include more lower energy symbols and fewer higher energy symbols.

Example 11. The intra-datacenter optical switch network of any of examples 1-10, wherein the DWDM signal comprises more than 50 channels.

Example 12. The intra-datacenter optical switch network of any of examples 1-11, wherein the plurality of channels in the DWDM signal have 50 MHz spacings.

Example 13. The intra-datacenter optical switch network of any of examples 1-12, wherein the plurality of channels in the DWDM signal have 75 MHz spacings.

Example 14. A method for optically transmitting data within an intra-datacenter optical switch network comprising: generating, using a probabilistically shaped quadrature amplitude modulation (PS-QAM) transmitter, QAM symbols that are shaped using a probability distribution, the PS-QAM transmitter being in a first node of the intra-datacenter optical switch network; generating, using the PS-QAM transmitter, a dense wavelength division multiplexed (DWDM) optical signal comprising a plurality of channels at different wavelengths that are combined using a multiplexer of the PS-QAM transmitter, each of the channels comprising a PS-QAM signal; transmitting, using one or more fiber links, the DWDM optical signal from the first node to a second node in the intra-datacenter optical switch network without optical amplification; receiving, using a PS-QAM coherent receiver in the second node, the DWDM optical signal; and separating the DWDM optical signal into separate PS-QAM signals using a demultiplexer in the PS-QAM coherent receiver.

Example 15. The method of example 14, wherein the PS-QAM coherent transmitter comprises a plurality of distribution matchers that generate the probabilistically shaped QAM symbols using the probability distribution.

Example 16. The method of any of examples 14 or 15, wherein the PS-QAM coherent receiver generates the separate PS-QAM signals without applying chromatic desperation compensation to the signal.

Example 17. The method of any of examples 14-16, wherein the PS-QAM coherent receiver decodes the separate PS-QAM signals using an inverse probability distribution that is inverse of the probability distribution of the PS-QAM coherent transmitter.

Example 18. The method of any of examples 14-17, further comprising a plurality of nodes and a spine switch.

Example 19. The method of any of examples 14-18, wherein the spine switch transmits the DWDM signal from the PS-QAM coherent transmitter to the PS-QAM coherent receiver without optical amplification.

Example 20. The method of any of examples 14-19, wherein the DWDM signal is transmitted over a single fiber of the one or more fiber links.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. An intra-datacenter optical switch network comprising:
a plurality of probabilistically shaped quadrature amplitude modulation (PS-QAM) transmitters that each generate probabilistically shaped QAM symbols using a probability distribution to generate a PS-QAM signal, the PS-QAM signal having a modulation order of at least 64-QAM;
a multiplexer that combines the PS-QAM signals from the plurality of PS-QAM transmitters to generate a dense wavelength division multiplexed (DWDM) signal for transmission over fiber within the intra-datacenter optical switch network, the DWDM signal comprising at least 80 DWDM channels at different wavelengths that each comprise one of the PS-QAM signals, the at least 80 DWDM channels in the DWDM signal having spacings of 75 GHz or less;
a demultiplexer that separates the DWDM channels of the DWDM signal;
a PS-QAM coherent receiver to receive one of the DWDM channels after the demultiplexer; and
one or more fiber links less than 2 km in length that transmit the DWDM signal from the multiplexer to the demultiplexer without optical amplification,
wherein:
the at least 80 channels and the spacings of the channels result in the DWDM signal spanning a wavelength band greater than a passband of an Erbium-Doped Fiber Amplifier; and
each PS-QAM transmitter shapes the QAM symbols to reduce cross-talk between the channels of the DWDM signal at the spacings of the channels of the DWDM signal.

2. The intra-datacenter optical switch network of claim 1, wherein the PS-QAM transmitters comprise a plurality of distribution matchers that generate the probabilistically shaped QAM symbols using the probability distribution.

3. The intra-datacenter optical switch network of claim 2, wherein the PS-QAM coherent receiver processes the PS-QAM signal of the received channel without applying chromatic dispersion compensation to the signal.

4. The intra-datacenter optical switch network of claim 2, wherein the PS-QAM coherent receiver decodes the PS-QAM signal of the received channel using an inverse probability distribution that is inverse of the probability distribution of the PS-QAM transmitter.

5. The intra-datacenter optical switch network of claim 1, further comprising a plurality of nodes and a spine switch.

6. The intra-datacenter optical switch network of claim 5, wherein one of the plurality of PS-QAM transmitters are in a first node of the plurality of nodes, and the PS-QAM coherent receiver is in a second node of the plurality of nodes.

7. The intra-datacenter optical switch network of claim 6, wherein the plurality of nodes are servers in the intra-datacenter optical switch network, the first node being a first server and the second node being a second server.

8. The intra-datacenter optical switch network of claim 1, wherein the DWDM signal is transmitted over a single fiber of the one or more fiber links.

9. The intra-datacenter optical switch network of claim 1, wherein the probabilistically shaped QAM symbols are shaped according to the probability distribution to include more lower energy symbols and fewer higher energy symbols.

10. The intra-datacenter optical switch network of claim 1, wherein the plurality of channels in the DWDM signal have 50 GHz spacings.

11. The intra-datacenter optical switch network of claim 1, wherein the plurality of channels in the DWDM signal have 75 GHz spacings.

12. A method for optically transmitting data within an intra-datacenter optical switch network, the method comprising:
generating, using a plurality of probabilistically shaped quadrature amplitude modulation (PS-QAM) transmitters in a first node of the intra-datacenter optical switch network, QAM symbols that are shaped using a probability distribution to generate a plurality of PS-QAM signals, the PS-QAM signal having a modulation order of at least 64-QAM;
combining, using a multiplexer, the plurality of PS-QAM signals into a dense wavelength division multiplexed (DWDM) optical signal comprising at least 80 DWDM channels at different wavelengths, each of the channels comprising one of the PS-QAM signals, the at least 80 DWDM channels in the DWDM signal having spacings of 75 GHz or less;
transmitting, using one or more fiber links less than 2 km in length, the DWDM optical signal from the first node to a second node in the intra-datacenter optical switch network without optical amplification;
separating, using a demultiplexer in the second node, the DWDM optical signal into separate PS-QAM signals; and
receiving and processing one of the separate PS-QAM signals with a PS-QAM coherent receiver,
wherein:
the at least 80 channels and the spacings of the channels result in the DWDM signal spanning a wavelength band greater than a passband of an Erbium-Doped Fiber Amplifier; and
each PS-QAM transmitter shapes the QAM symbols to reduce cross-talk between the channels of the DWDM signal at the spacings of the channels of the DWDM signal.

13. The method of claim 12, wherein the plurality of PS-QAM coherent transmitters comprises a plurality of distribution matchers that generate the probabilistically shaped QAM symbols using the probability distribution.

14. The method of claim 13, wherein the PS-QAM coherent receiver processes the one of the separate PS-QAM signals without applying chromatic dispersion compensation to the signal.

15. The method of claim 14, wherein the PS-QAM coherent receiver decodes the one of the separate PS-QAM signals using an inverse probability distribution that is inverse of the probability distribution of the PS-QAM coherent transmitter.

16. The method of claim 12, wherein the DWDM signal is transmitted over a single fiber of the one or more fiber links.

\* \* \* \* \*